United States Patent [19]
Stonehouse et al.

[11] Patent Number: 5,845,501
[45] Date of Patent: Dec. 8, 1998

[54] CHILLING DEVICE FOR BEVERAGE CONTAINER

[76] Inventors: David Richard Stonehouse, 14a Long Lane, Finchley, London N3 2PT; Timothy Michael Wood, 6 The Lawns, Melbourn, Royston Hertfordshire SG8 6BA; Craig Harvey Nelson, 32 Merchants Walk, Baldock, Hertfordshire SG7 6TJ; David Livingstone, "Stryp Lynch", 71 Fowlmere Road, Heydon, Royston, Hertfordshire SG8 8PZ; Frances Brindle, 37 Hall Cottages, Wood Lane, Kidmore End, Oxfordshire RG5 9BD; Philip Theaker, 56 Eskfield Grove, Eskbank, Dalkeith, Midlothian, EH22 3FA, all of United Kingdom

[21] Appl. No.: 809,351
[22] PCT Filed: Sep. 21, 1995
[86] PCT No.: PCT/GB95/02259
§ 371 Date: Aug. 27, 1997
§ 102(e) Date: Aug. 27, 1997
[87] PCT Pub. No.: WO96/09506
PCT Pub. Date: Mar. 28, 1996

[30] Foreign Application Priority Data

Sep. 22, 1994 [GB] United Kingdom ............... 9419152
Jun. 30, 1995 [GB] United Kingdom ............... 9513387

[51] Int. Cl.$^6$ ................................ F25D 3/10; F25D 7/00
[52] U.S. Cl. ................................ 62/62; 62/293; 62/294; 62/457.9
[58] Field of Search ............... 62/62, 293, 294, 62/457.9, 457.4

[56] References Cited

U.S. PATENT DOCUMENTS 2,773,358 12/1956 Palmer ........................... 62/294
2,805,554 9/1957 Schachtsiek .
2,805,556 9/1957 Wang .
2,898,747 8/1959 Wales .
3,373,581 3/1968 Strader .
3,553,976 1/1971 Cumine .
4,054,037 10/1977 Yoder .
4,597,271 7/1986 Nof ................................. 62/294
4,640,101 2/1987 Johnson .
4,669,273 6/1987 Fischer et al. ............... 62/294
5,214,933 6/1993 Aitchison .
5,447,039 9/1995 Allison ........................... 62/293

FOREIGN PATENT DOCUMENTS

2133680 12/1972 France .
91 14 921 7/1992 Germany .

Primary Examiner—Christopher B. Kilner
Attorney, Agent, or Firm—Lee, Mann, Smith, McWilliams, Sweeney & Ohlson

[57] ABSTRACT

A device for chilling the contents of a beverage container (10, 74) comprising a shell, the interior of which is adapted to accommodate the container (10, 74) the contents of which are to be chilled, and the wall of which comprises an annular reservoir (16, 70) for liquified refrigerant gas under pressure, which surrounds the container. The reservoir (16, 70) is openable at (30, 76) to permit the liquefied refrigerant to escape therefrom and create a cooling effect on the wall of the container (10, 74), consequent on the change of phase from liquid to gas, and expansion of the gas, to chill the container (10, 74) and its contents. The outer surface of the shell is formed with a heat insulating layer (24, 78) so that the cooling effect is preferentially directed towards the interior. The reservoir (16, 70) may be vented at the top of the bottom or through a plurality of apertures (106, 108) distributed around the interior of the shell. The venting apertures (106, 108) are small so as to restrict the flow of refrigerant and cause the cooling effect to occur over a period time. In a preferred embodiment the reservoir comprises a coiled tube (16, 70) within which the container (10, 74) is a snug fit. A rotatable base (22, 72) serves to close off the underside of the shell and provides a mechanism for venting the reservoir (16, 70).

22 Claims, 6 Drawing Sheets

CHILLING DEVICE FOR BEVERAGE CONTAINER

FIELD OF THE INVENTION

This invention concerns the packaging of beverages, particularly devices for cooling cans and bottles containing alcoholic or non-alcoholic beverages before the beverage is to be consumed.

BACKGROUND OF THE INVENTION

Whilst it is possible to cool packaged beverages by placing them in the refrigerator and where appropriate if transportation is required, transporting the cooled beverage in a cold box or chilled compartment, there are many situations where it is not convenient to store or transport beverage containers in this way and it is virtually impossible for the consumer to enjoy a chilled drink. The warmer the weather, the greater is the likelihood that the consumer will wish the beverage to be chilled and in those conditions, unless a chilling cabinet or container is available, the drink will probably become warm as a result of the ambient temperature making it even less acceptable than would otherwise have been the case.

It is an object of the present invention to provide a portable device by which the contents of a container (can or bottle) can be chilled just before consumption.

It is a prerequisite that the wall of the container will permit the transfer of heat therethrough and to this end the invention is primarily of application to thin walled metal 2 and 3 piece beverage cans, such as are formed from aluminium or steel.

SUMMARY OF THE INVENTION

According the present invention, a device for chilling the contents of a beverage container comprises a shell, the interior of which is adapted to accommodate the container the contents of which are to be chilled, and the wall of which comprises an annular reservoir for liquified refrigerant gas under pressure, which surrounds the container, and means which is openable to permit the liquified refrigerant to escape from the reservoir and create a cooling effect on the wall of the container, consequent on the change of phase from liquid to gas, and expansion of the gas to chill the container and the contents thereof.

Preferably an outer surface of the shell is formed with a heat insulating layer or sleeve so that the cooling effect is preferentially directed towards the interior of the shell and towards any container (and its contents) located therein.

The venting may be provided at the upper or lower end of the shell.

The reservoir may be vented through a plurality of apertures distributed around the interior of the shell so that cooling is available at a plurality of points around the container.

The venting apertures may be small so as to restrict the flow of refrigerant and cause the cooling effect to occur over a period of time.

Coiled tube reservoir

Preferably the reservoir comprises a coiled tube filled with the liquified refrigerant gas.

Conveniently a beverage container is a snug fit within the coiled tube.

Preferably means is provided for fracturing, or forming, or exposing at least one hole in the tube wall to form an exit orifice through which the refrigerant can issue, when cooling is required.

The coil may include more than one layer of turns.

Preferably one end of the coil is closed off by windings of ever decreasing radii in at least one layer which forms an end to the shell which will normally engage the underside of the beverage container when the Latter is fitted therein. The layer of turns which is to contact the underside of the container may be profiled so as to intimately follow any contours of the underside of the beverage container.

The free end of the tube conveniently extends generally centrally and axially from the windings below the container, in a direction away from the container.

Venting the reservoir

The tip of the protruding tube end is preferably formed with a non-circular cross-section to enable it to be gripped and twisted relative to the remainder of the tube, to cause a fracture in the wall of the tube when the latter is to be vented to achieve cooling.

Preferably the wall of the tube just beyond the end region of non-circular cross-section is weakened, to facilitate its fracture.

The tube is preferably formed with a restricted internal cross-section just beyond the region which fractures when the end is twisted. The restriction may be achieved by way of a restrictor having a tiny orifice, which is secured into the pipe before it is filled.

Preferably there is a member at the base of the device, which is rotatable relative to the shell to effect venting of the reservoir and release of the refrigerant. The rotatable member conveniently forms a base on which the device can stand, and rotation of the rotatable member conveniently effects fracture of the pipe from which the coil is formed.

Alternative reservoir venting

In an alternative embodiment the fracture of the tube wall to obtain cooling may be effected by breaking open a weakened wall region of the tube by pulling a ring pull or the like attached thereto. To facilitate access, the ring pull or like device may be provided on an external surface of the coiled tube. The ring pull or like device may be located near one end of the tube.

Where the fracturable wall region of the tube is located at the base of the assembly, means is preferably provided for collecting the escaping refrigerant and directing it upwardly around the coil to finally vent to atmosphere at the upper end of the shell.

In a further alternative embodiment, the fracturable wall region of the tube and associated ring-pull or like device, are located substantially mid-way along the coil, so that escaping refrigerant is drawn from both the upper and lower reaches of the coil. Restrictors may be provided in the tube on either side of the fracturable region thereof, to restrict the outflow of refrigerant.

Valved control of reservoir venting

In a still further embodiment discharge of the refrigerant from the pressurised container may be activated and controlled by a valve means, which may for example comprise a ball located in a socket and held seated by the refrigerant pressure, against a valve seat in the socket. An activator may be provided, which operates to lift the ball away from the seat to allow release of the refrigerant when cooling is required.

The ball may also be held seated against the valve seat by spring means.

The valve may be positioned at the top or bottom of the coil.

Improved heat transfer

A second tube may be wound in between the turns of the first tube in contact with the container, which communicates with a compartment at the base of the assembly (into which the refrigerant passes on venting the first tube) and a vent to atmosphere at the upper end of the assembly, so that the released refrigerant is forced to pass through the said second tube to further improve heat removal from the container.

Where a rotatable base member is provided, rotation thereof conveniently serves to elevate the valve actuator to permit refrigerant to escape.

The valve opening device may be a pin which lifts the ball off the seat.

Packaging detail

In order to improve the appearance of the package, a ring of material may be provided to close the gap between the external packaging sleeve and the wall of the can at the upper end of the coil. The ring may be formed from porous materia, to permit the passage of gas. Where the ring is formed from non porous material, gas transfer passage means is preferably left, or formed, therein.

Tube design

The tube may be formed from copper or steel or plastics material and at least the tube in contact with the container may be formed with a D-section, or square section, so as t provide a greater surface area for contacting the external surface of the container.

Where the plastics material is porous the tube may be coated or otherwise covered with an impervious skin.

Intearal package

The invention also lies in a beverage container when fitted within a sleeve formed from a coiled tube filled with liquified refrigerant gas which tube is openable to permit controlled escape of the refrigerant to effect cooling of the container and its contents.

The invention also lies in a method of forming a shell for receiving a beverage container, comprising the steps of filling a length of tube with a liquified refrigerant gas, sealing the tube and winding the tube around a mandrill to form a cylindrical sleeve, the internal diameter of which will accommodate as a close fit the beverage container. Subsequently there may be fitted to a shell a means for venting the refrigerant to atmosphere, to thereby cause a container to be cooled at least by a liquid to gas phase change.

An external packaging sleeve may be fitted around the coiled tube. The packaging sleeve may be of cardboard or plastics material or metal or metallised cardboard or foil or any combination thereof and may be secured to the coiled tube by means of an adhesive.

The coil may be wound as a single or multiple layer helix, and the winding of the coil is preferably continued below the underside of the container in at least one layer in which the turns are of successively decreasing radius, so as to close off the lower end of the coil and provide a platform for the underside of the container to rest on.

Where the underside of the beverage container is concavely domed, as is the case of a conventional beverage can, those turns making up the layer which is to contact the underside of the container are arranged so as not to be coplanar but to present a profile surface complementary to that of the base of the container.

The free end of the tube is preferably led out generally centrally and axially from the windings at the end of the coil, and the tip of the tube may be formed into a non-circular cross-section for engaging in a similarly shaped non-circular aperture in a member which is rotatable relative to the coil, thereby to twist the end of the tube relative to the remainder thereof and thereby break the tube where it protrudes from the windings.

The method may also include the step of forming a weakened region in the wall of the tube just above the tube end, to facilitate the fracturing of the tube by twisting the end thereof below the weakened region.

The method may also include the step of forming the tube with a restricted internal cross-section upstream of the weakened region.

The restricted internal cross-section may be obtained by fixing into the tube a restrictor having only a tiny orifice for the refrigerant to pass through, so that when the tube is broken, the refrigerant can only escape through the tiny orifice in the restrictor in a controlled manner.

Method of filling the tube

The invention also provides a method of filling a tube with liquified refrigerant gas, in which the liquid is supplied into one end of the tube through a nozzle, and a venting opening is provided at the other end thereof (furthest from the filling nozzle), and when liquid appears at the venting opening, the latter is closed off and the fill completed by sealing the end which has been supplied by the filling nozzle.

It has been noted that there is an advantage in venting the liquid refrigerant from the lower end of the reservoir formed by the coiled tube, since due to gravity, the liquid refrigerant will tend to be in the lower reaches of the coil and any gaseous phase of the refrigerant (which will always exist in the reservoir) will tend to be in the upper reaches of the coil. By venting at the bottom of the coil, it will normally be liquid refrigerant which is exposed to atmosphere through the venting orifice, and the cooling effect will be enhanced since energy will be drawn from the immediate environment and in particular the contents of the can, in order to produce the phase change from liquid to gas at that orifice.

The coil may be formed from ordinary round section tube and after having been formed, the coil may be subjected to a uniform radial compression force between a central mandril and for example an external roller so as to flatten the tube into a more square section and produce a substantially flat inside surface to the coil and a similar substantially flat external surface thereto.

Refrigerant materials

Preferred refrigerants for cooling devices as aforesaid are liquid CFC, HCFC and HFC gases, liquified Isobutane, liquified Carbon Dioxide and mixtures of liquid Carbon Dioxide and Isobutane or a CFC.

Environmental considerations dictate that the more preferred refrigerant is liquid Carbon Dioxide.

Another possible refrigerant is the refrigerant known as 22, such as is used for rapidly freezing water pipes to assist plumbers in mending leaks and changing fittings in water containing pipework.

The advantage of the refrigerant-22 over Carbon Dioxide is the pressure of refrigerant-22 at 70° C. Thus is the case of refrigerant-=22 the pressure at 70° C. is approximately 28 bar whereas Carbon Dioxide has a pressure of 400 bar at the same temperature. However whereas the ozone depletion potential of Carbon Dioxide is deemed to be zero, that of refrigerant-22 is 0.05 on a scale in which a CFC is 1.

For a typical popular can size of 340 ml, the volume of refrigerant-22 required will be of the order of 100 ml and since the heat capacity in joules per millilitre of both refrigerant-22 and Carbon Dioxide is approximately the same, an equivalent volume of Carbon Dioxide would b required, albeit at a much higher pressure.

Another refrigerant which has a slightly lower heat capacity of 170 joules per millilitre is refrigerant 134A which at 70° C. will exert a pressure of some 21 bar.

Other refrigerants which are expected to become available on a commercial basis are KLEA61 and MP39 respectively, having heat capacities of 230 and 310 joules per millilitre at pressures (at 70° C.) of 39 and 24 bar respectively.

Whilst 134A and KLEA 61 are deemed to have a zero ozone depletion potential, MP39 is somewhat similar to refrigerant-22 which on a scale of CFC equal to 1 possesses an ozone depletion potential of 0.03.

The component blends of types 22 and 134A are known. The blends of KLEA 61 and MP39 are as follows:

KLEA61—10% type 32, 70% type 125 and 20% type 134A

MP39—53% type 22, 13% type 152A and 34% type 124.

Whilst Carbon Dioxide is attractive in principle, the very high pressure which has to be contained at temperatures much above 31° C. means that a pressure vessel will be needed and this will inevitably increase the cost of the product if Carbon Dioxide is to be used for the refrigerant. Additionally the cooling effect of Carbon Dioxide tends to fall off as the temperature rises above 23° C.

It will be appreciated that if the can is left in the open exposed to bright sunlight, the contents of the can may well rise to temperatures considerably above 31° C. and in any case if the contents of the can are to be pasteurised it will be heated to 70° C. or thereabouts.

It is envisaged that if Carbon Dioxide is to be used as a refrigerant, not only will a high pressure container be needed, but also a method of using the work energy which can be generated. It is also noted that Carbon Dioxide has similar toxicity to the HCFCs.

In order to obtain sufficient expansion and volume of cooling gas, it is almost inevitable that the vaporising liquid will have to exit to atmosphere. Criteria to be applied to the selection of refrigerant materials for the device are therefore as follows:

the vapour must be non-toxic and preferably non-anaesthetic, the vapour should not possess any pungent or unpleasant odour, the vapour should not be environmentally damaging, and the vapour should not be flammable.

Methods of beverage packaging cans which are to be fitted with a can-cooler

Where the contents of a can has to be pasteurised and the pasteurisation involves heating the liquid within the can to temperatures of the order of 70° C., the invention provides a method of packaging a beverage in a can comprising the steps of filling the can and sealing the latter in a conventional manner, subjecting the filled and sealed can to a pasteurisation process involving raising the temperature of the can and its contents to approximately 70° C., cooling the can, and thereafter affixing thereto a sleeve as aforesaid around the can containing a liquified refrigerant gas, which is openable to permit the pressurised contents to exit therefrom and pass over at least part of the can so as to cool the latter and its contents.

Advantaae of the invention

It is an advantage when using a device such as described and claimed herein that the vessel containing the liquified gas is separate from and external to the beverage container. Whilst the latter is designed to withstand pressures typically of the order of 7 or 8 bar, which will arise during pasteurisation at temperatures of the order of 70° C., the former may need to contain pressures considerably in excess of that level especially if Carbon Dioxide is used as the refrigerant. If the device containing the liquified refrigerant gas were within the beverage container, then for safety, the latter would also have to be capable of withstanding the much higher pressure contained with the liquified gas cannister. This would be a clear disadvantage which would necessitate an increase in the wall thickness and operational strength of what has been developed as a relatively low cost packaging device, namely the two and three piece thin can, especially when constructed from aluminium.

On the other hand, since the cooling is applied to the outside of the can or bottle, the transfer of heat from the liquid contents of the vapour cannot occur instantaneously and as the outer layers of liquid within the can or bottle become cooled, it is necessary for them to be replaced by warmer liquid from the central regions of the can or bottle before complete cooling is effected. It is therefore a desirable feature of the invention that the escaping gas, effecting the cooling, leaks past the can or bottle surface in a controlled and relatively slow manner, and in any case for a sufficient period of time, to permit thorough cooling of the contents of the can or bottle.

In the case of a beer having a nominal 340 ml volume, the volume of liquid, in the case of beer will be typically 280 ml and the can height will be approximately 140 mm and the can diameter will be of the order of 72 mm. Using that size of can and volume of liquid, the time required to cool the contents of the can has been found to be of the order of 1 to 3 minutes, and for effective cooling, the passage of coolant over the exterior of the can has to occur during a roughly similar period.

The invention will now be described by way of example, with reference to the accompanying drawings, in which.

Figure 1:
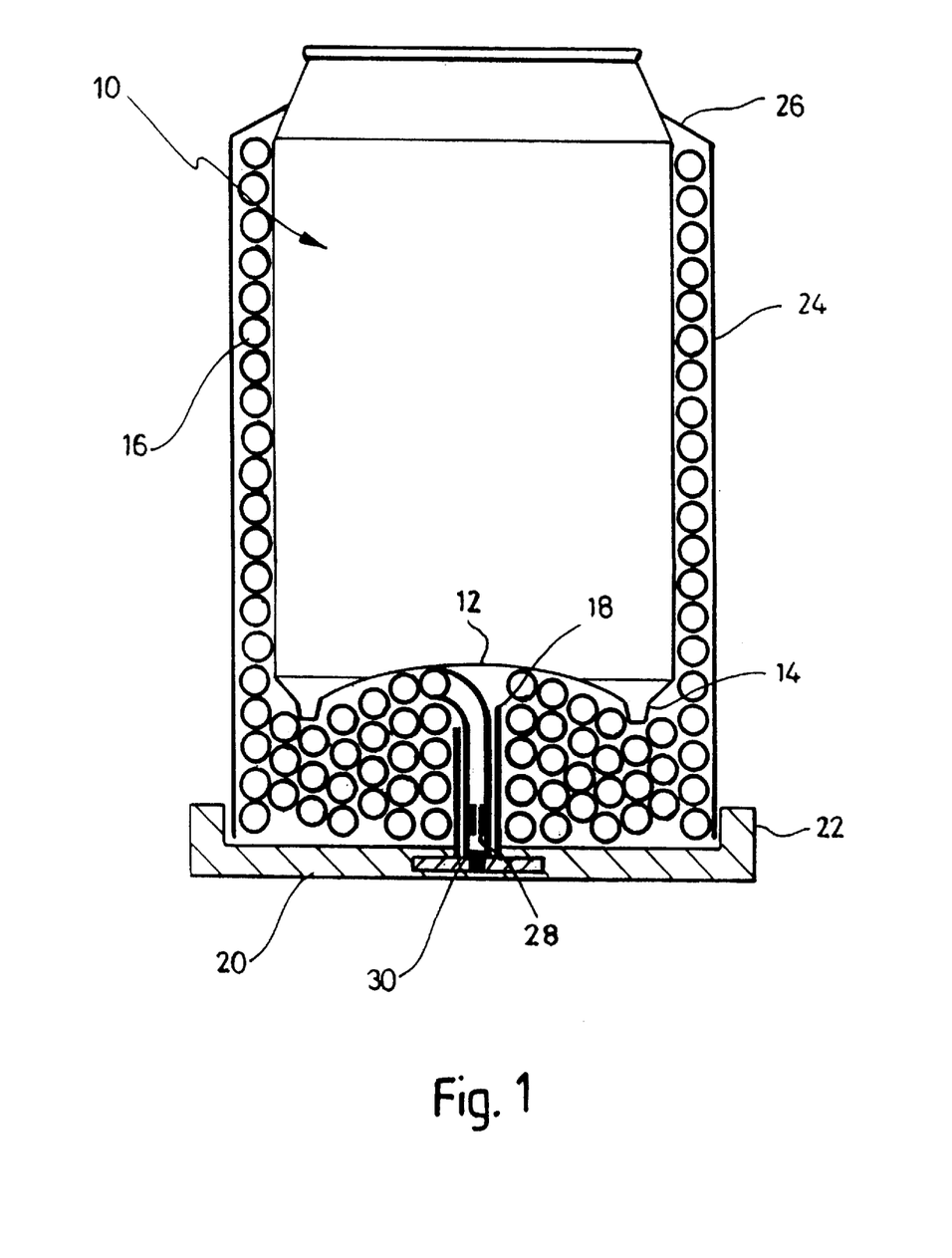
FIG. 1 is a cross-section through an assembly of composite refrigerant reservoir/heat exchanger and standard drinks can, constructed as another embodiment of the invention.

In FIG. 1 a standard 330 ml two-part aluminium drinks can is identified by reference numeral 10 and is shown diagrammatically in section so as to indicate the domed base of the can 12 which is surrounded by the annular base 14 on which the can will normally stand on a flat surface.

In accordance with the invention, a metal tube 16 is shown wound as a close spaced helix around the can wall to form part of a reservoir for a refrigerant and also to form part of the heat exchange to extract heat from the can when the refrigerant is activated.

At the base of the can, the metal tube is coiled en masse so as to fill up an annular space below the can around a central tube 18 axially aligned with the can 10 and down through which one end of the tube 16 extends. At its lower end the tube is secured to a circular base 20 which extends across the underside of the coiled mass of tube below the can and includes an upstanding rim 22 which encloses the lower end of a cylindrical sleeve 24 of cardboard or paper or metal or plastics material which typically includes a layer of thermally insulating material. At the upper end the sleeve 24 converges as at 26 so as to engage the upper regions of the can 10 so as to neatly finish off the sleeve and if required seal the sleeve to the can at the upper end thereof so that any gas or vapour which escapes into the sleeve 24 cannot escape in an upward direction but has to escape at a lower level.

Depending on the refrigerant used, there may be a degree of vaporisation or gasification which is visible and it is preferable that this is seen to be emanating from the lower reaches of the assembly shown in FIG. 1. To this end the fit between the rim 22 and the sleeve 24 may be less than perfect so that any gas or vapour can escape through the gap between the rim 22 and the sleeve 24.

Passages, apertures, cut-away regions or other communication means may be provided in the base 20 and the rim 22 to assist in the escape of any such gas or vapour.

The tube 16 is filled with a liquid refrigerant typically liquid Carbon Dioxide or a combination of Carbon Dioxide and another gas and the end of the tube at the upper end of the coil as shown in FIG. 1 is sealed as is the lower end of the tube as it passes through the larger tube 18.

Cooling is obtained by releasing the pressure in a controlled manner and allowing the liquid gas or gases to evaporate, the heat required to achieve that evaporation being derived from the immediate vicinity of the evaporating gas or gases thereby causing a local intensive cooling effect.

The cooling will extend throughout the length of the coiled reservoir as a result of thermal conduction and the can will be cooled.

A convenient exit for the evaporating gas is the lower end of the tube at the lower end of the larger tube 18. To this end part of the wall of the tube 16 extending through the outer tube 18 is formed as a frangible section such that relative rotation of the lowermost end of the tube 16 relative to the remainder of the tube brings about a localised fracturing of the wall of the tube 16.

In order to control the rate of evaporation, a restriction 28 is crimped into the tube 16 just above the frangible section 30 so that irrespective of the hole made in the wall of the tube by the breaking of the frangible section, the release of the evaporating gas or gases will be controlled by the small orifice in the restriction 28.

In the case of a 330 ml can, the overall length and internal diameter of the tube 16 is selected so as to provide a reservoir volume equivalent to between 100 and 150 ml and the material from which the tube wall is formed is selected so as to be capable of withstanding the pressures required to maintain Carbon Dioxide in its liquid phase at ambient temperatures up to in excess of 30° C. Using 6 mm internal diameter tube this would require 5.3 m. to give 150 ml and 3.5 m. to give 100 ml.

According to a particularly preferred feature, the lowermost end of the tube 16 where it protrudes through the larger diameter tube 18 is formed into a square section to provide a key to transmit rotation to the end of the tube. This square section may be formed by crimping the tube or by fitting within the tube a length of metal or other material which is sufficiently soft to allow a subsequent squeezing operation to shape the outside section of the tube to the desired square cross-section shape.

It is then a simple matter to fix a rotatable element such as the rotary base 20 to the protruding square end of the tube as by an adhesive or a simple push fit or by allowing the square section to protrude beyond the end of an aperture in the base 20 so that it can be peened over using a suitable impact device.

The frangible section is conveniently formed by a semi-cut around the outside of the wall of the tube 16 so that sufficient material is left to maintain the integrity of the tube and contain the internal pressures but the reduced wall thickness is such that as soon as the tube is twisted the weakened wall region fractures thereby releasing the pressure within the tube at least below the restrictor 28, to atmospheric.

In order to improve the appearance of the assembly, the rim 22 may be extended axially to a greater extent than that shown in FIG. 1 and an outer surface of the rim 22 may be knurled or otherwise contoured so that if the can sleeve 24 is held in one hand, the rim 22 can be gripped by the other hand and twisted relative to the can sleeve 24 causing the frangible section 30 to fracture and evaporation to begin.

In use the can assembly is then placed with the base 20 on a flat surface and left until the evaporation process has completed and the can 10 has been chilled to the desired temperature. At this stage the conventional ring-pull or other opening mechanism at the upper end of the can may be operated so as to relieve the pressure within the can in known manner and permit the liquid within the can to be poured out.

Using a volume of between 100 and 150 ml of liquid Carbon Dioxide, a restrictor 28 such that the refrigerant will evaporate over a period of between one and two minutes, a cooling of the liquid contents of the can by approximately 10° to 18° C. can be obtained. If therefore the can is at 25° C., after three minutes the can and its contents can be chilled to approximately 10° C. which has been found to be a relatively acceptable temperature for a beverage such as a lager or a beer or a soft drink to be consumed and the perceived as a refreshing cold drink on a hot day.

If the can is cooler than 25° C. then an even lower final temperature can be achieved such that the beverage will be perceived to be almost icy cold.

Although described as being in liquid form, the refrigerant gas which is stored under pressure and is to serve as a cooling agent on release, may be in a solid form in the reservoir, in which event cooling may occur due to sublimation.

Figure 2:
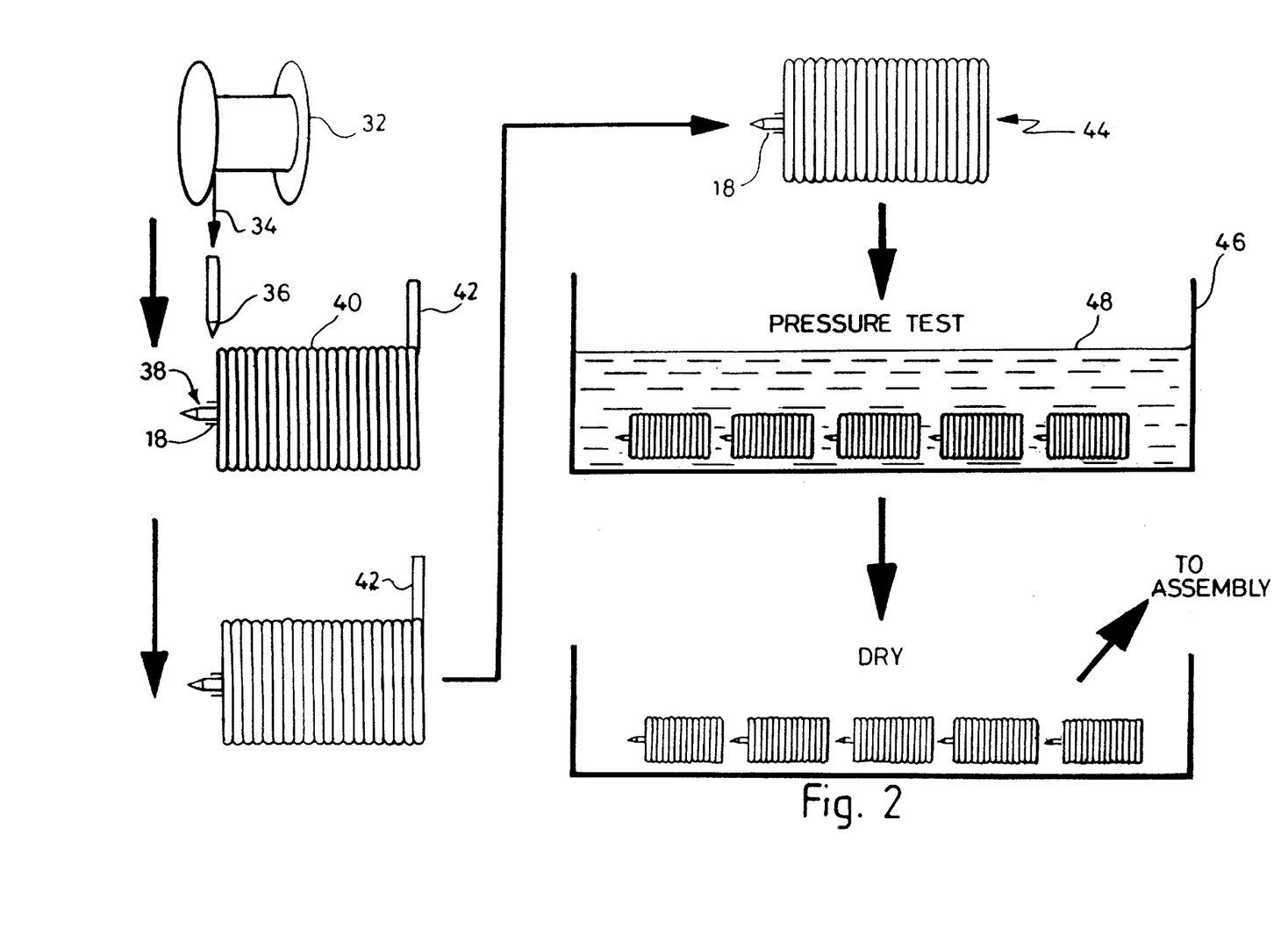
FIG. 2 illustrates how the reservoir/heat exchanger can be constructed from a metallic tube.

FIG. 2 shows how the heat exchange/reservoir can be constructed from tube drawn from a reel. The reel is denoted by reference numeral 32 and tube drawn from the reel is denoted by reference 34.

The leading end of the length of tube is sealed as at 36 as by crimping, welding an adhesive plug or the like and the sealed end is bent through 90° to protrude axially from a drum mandrill at 38 and the remainder of the length of the tube is wound initially around the tube 18 to form a bundle as shown in FIG. 1 and thereafter as a close helix denoted by reference numeral 40 to form a single layer coil, the end of the tube severed from the remainder of the tube from the reel being denoted by reference numeral 42.

The coiled reservoir is now filled with liquid refrigerant under pressure through the open end of the tube end 242 after which the tube end 42 is sealed as by crimping and is finally wound around the helix so as to lose the end 42 within the diameter of the coil.

The coil can now be removed from the mandril if desired and the axially protruding end 18 can be formed with a square section or other drive transmitting configuration as by an appropriate crimping or machining or forming operation (not shown) so as to leave a semi-finished product generally designated 44.

It is of course necessary to ensure that the reservoir can withstand the excess pressures which will exist if and when the contents of the tube are heated if for example the can is left in open sunlight on a warm summers day and to this end a pressure test is performed typically on a batch basis by locating a plurality of semi-finished products 44 in a large bath 46 containing liquid typically water 48. The temperature of the water 48 is such as to correspond to the maximum temperature which the can would be subjected to in normal use say for example 35° C. and by leaving the sealed pressurised coiled reservoirs 34 within the bath 46 for a reasonable period of time, the refrigerant and reservoir will be heated to the temperature of the water 48. Any failures will be readily evident by severe bubbling and can be marked and removed and all those reservoirs which have passed the pressure test can be removed from the walled bath 46 and dried.

This may be achieved either by removing the water from the bath 46 or removing the articles from one bath and placing them in a drying chamber.

A particularly preferred arrangement involves pumping the warm water between two baths so that when one bath is full the other is empty. A warm air blast directed to the articles in the empty bath assists in drying them and thereafter the dry articles can be removed and replaced by a fresh set of semi-finished products 44. While this is occurring, the other bath is full of warm water and the semi-finished products 44 located therein are being subjected to a pressure test as aforesaid. When the empty bath has been loaded with the fresh semifinished products, the warm water can be pumped from the other bath into the empty bath so as to evacuate the bath containing the semi-finished products which have been subjected to the pressure test and cause the new batch of semi-finished products to be subjected to their own pressure test whilst a drying air blast is directed towards the semi-finished products which have been subjected to their pressure test and are now waiting to be dried and removed and replaced with another batch.

In this way the process can be operated in a relatively continuous manner. if a cycle time is such that it cannot accommodate the rate of arrival of incoming semi-finished product, more baths may be provided so that there is always an empty bath with dried product waiting to be removed and. filled with incoming product.

Alternatively the pressure test may be achieved by passing product on a flexible conveyor belt through a warm water bath and thereafter through a drying chamber.

In either case whether on a batch or continuous basis, any semi-finished product which reveals a leak by bubbling when submerged in the warm water, is marked or immediately removed and discarded.

FIG. 3 shows how the semi-finished product can be fitted around a can and FIG. 3 also demonstrates the advantage of the invention over other self-cooling devices in that the semi-finished product 44 can be fitted around an existing filled can. These are shown as arriving by the flow arrow 50 in FIG. 3 and flow arrow 52 indicates the direction of arrival of semi-finished product 44 such as described with reference to FIG. 10. In FIG. 3 one of the cans arriving along line 50 is shown as having been inserted into a semi-finished product coil 44 so that the square end 54 extending axially from the lower end of the assembly as shown in FIG. 3A.

Figure 3A:
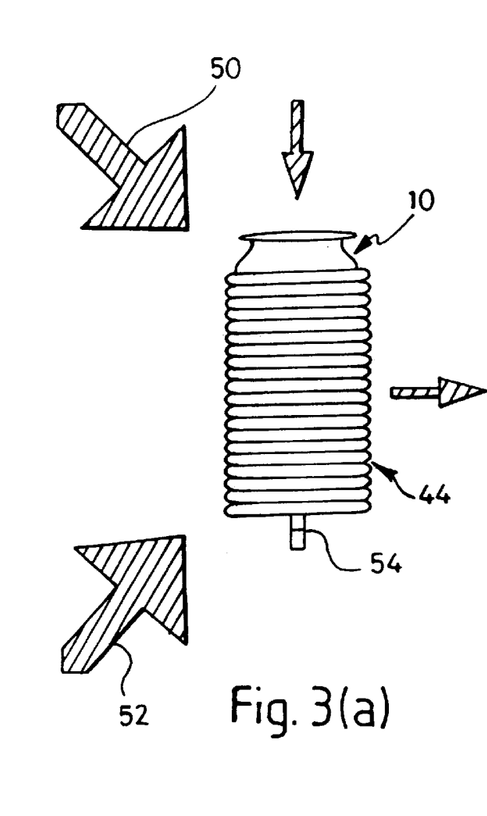
FIG. 3 illustrates how the reservoir/heat exchanger and can may be assembled to form the package shown in FIG. 9.
Figure 3B:
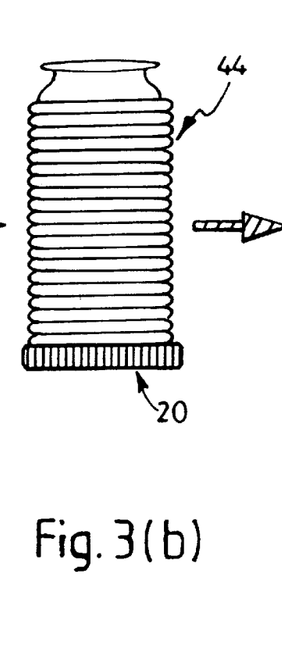

The next part of the assembly process comprises the fitting of the circular base 20 to the protruding end 54. This is shown in FIG. 3B.

Figure 3C:
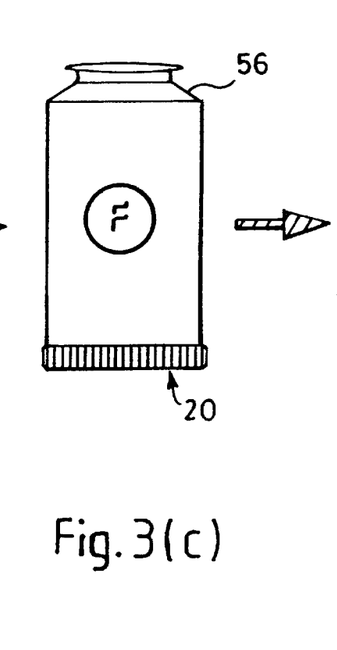

Thereafter as shown in FIG. 3C, the sleeve 24 is fitted around the tube coil assembly 44 and an appropriate fast setting adhesive or bonding agent or filler is applied to close the gap between the upper end of the sleeve 24 and the can 10 is denoted by reference numeral 56.

Figure 3D:
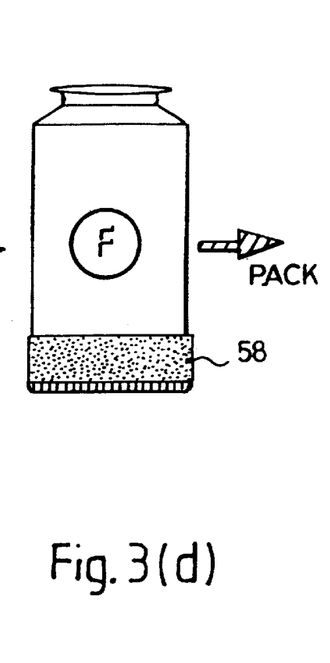

Lastly as shown in FIG. 3D, an anti-tamper sleeve may be secured around the lower end of the sleeve 24 and the base 20 as denoted by reference numeral 58 so as to prevent the base 20 being rotated relative to the can sleeve 24. Only after the anti-tamper band 58 has been broken can the base 20 be rotated and until it is rotated the frangible section 30 (not shown) will not be severed so that the integrity of the reservoir will be maintained.

Figure 4:
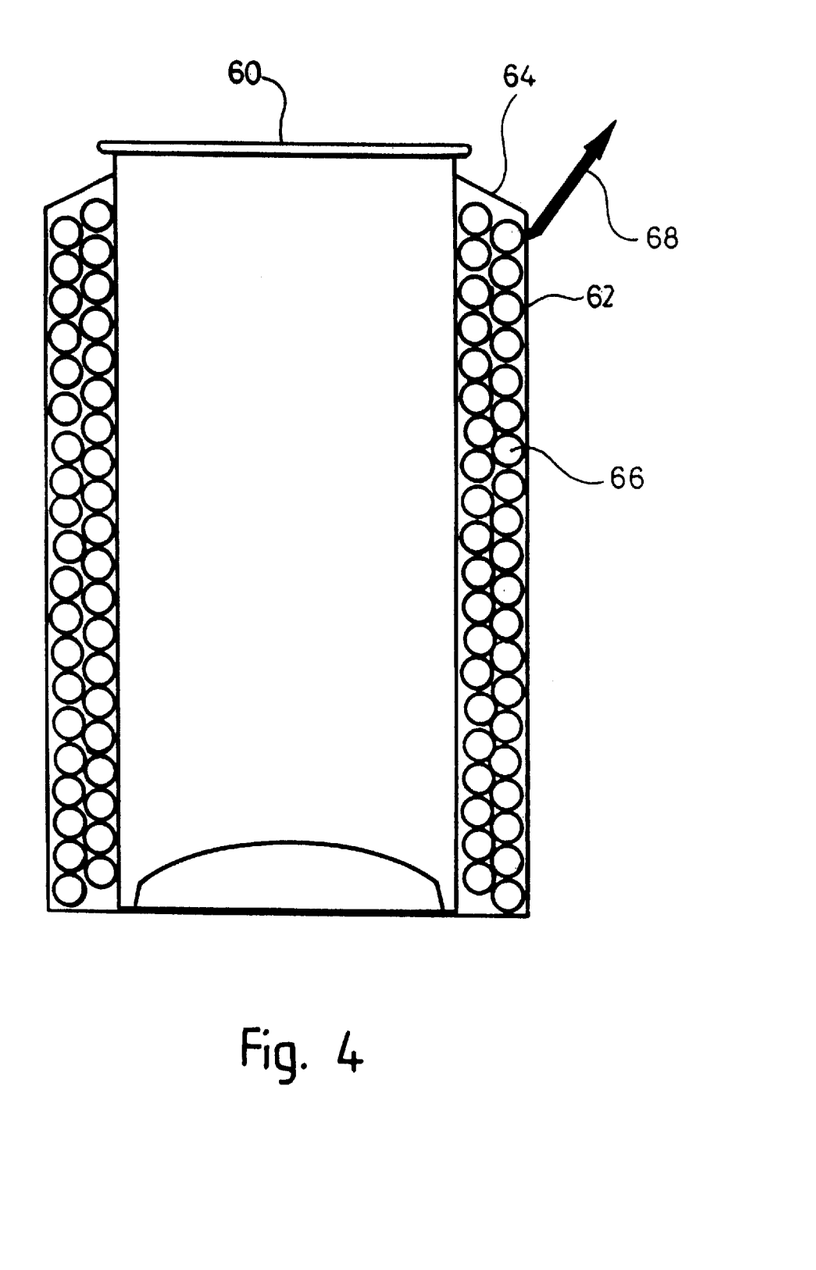
FIG. 4 is a cross-section through an alternative reservoir/heat exchanger can cooling arrangement, also constructed in accordance with the invention, and which is specifically adapted for use with smaller diameter cans.

FIG. 4 shows an alternative assembly in which a similar length of tube is wound as two layers around the can wall instead of a single layer with the remainder being bunched en masse below the can. The winding of the helix involves a similar technology to that for winding coils and is conventional technology. Provided the tube is pressurised by having been sealed after filling with liquid Carbon Dioxide, there will be no tendency for the tube wall to collapse during winding of the coil and this point applies whether the coiling is as shown in FIG. 4 or in FIG. 1.

In FIG. 4 the can is denoted by reference numeral 60, the outer sleeve 62, the upper infill 64 and the tube wound as a two-layer helix is denoted by reference numeral 66.

Whereas the tubular reservoir of FIG. 1 is evacuated at the base, an alternative approach is shown in FIG. 4 in which a frangible section is provided in a wall section of the tube located near the upper end of the assembly of FIG. 4 and a rip tab or ring-pull device is provided (not shown) for pulling in the direction of the arrow 68 (or in a downward sense if preferred) so that by holding the can assembly in one hand, the rip tab can be pulled in an appropriate sense such as shown in FIG. 4 at arrow 68 so as to break a small section of the wall of the tube 66 and permit the liquid refrigerant therein to evaporate.

As in the case of the FIG. 1 embodiment, a restrictor may be provided to control the escape of evaporating vapour/gas and if the frangible section of the tube 66 is not located at one end of the length of tube or the other, then two restrictors may be provided one on either side of the frangible section so that the refrigerant located on either side of the frangible section has to pass through a restrictor before it can evacuate to atmosphere.

The cooling effect is obtained in exactly the same way as that described with reference to FIG. 1, except that now the base of the can is not exposed intimately to the tubular reservoir and the cooling effect on the contents of the can is entirely that obtained through the cylindrical wall of the can.

As before, once the can has cooled, the conventional ring-pull or other device for opening the can is operated and the contents of the can be poured out therethrough.

FIGS. 5 to 8 refer to an alternative venting device by which refrigerant contained under pressure within a tubular reservoir 70 can be released when required by rotating a cylindrical base 72.

Figure 5:
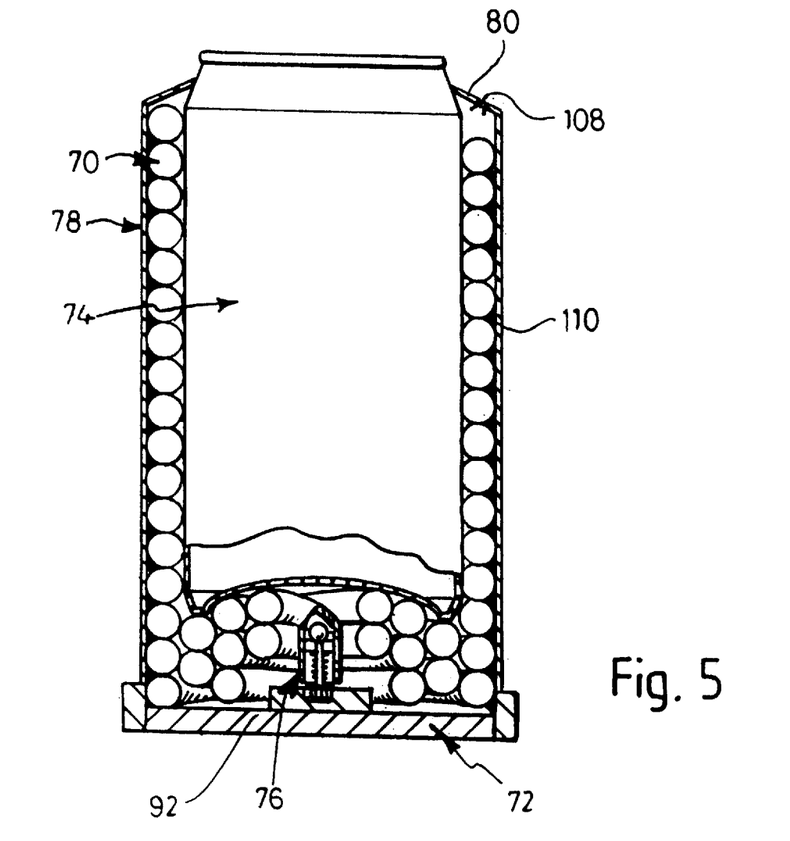

The reservoir is formed by a coiled tube which defines a generally cylindrical region for receiving the cylindrical part of a can 74 as a snug fit therein and which is bundled at the lower end of the coil so as to occupy a region below the concave end of the can and the bunching and bundling of the coiled tube forms a domed surface which is substantially complementary to the concave underside of the can. The upper end of the tube 70 is closed and the lower end is attached to a tubular closure device which includes a valve and which is generally designated 76. As previously described an insulating sleeve 78 surrounds the tubular reservoir to improve the overall appearance of the package and a closure ring 80 closes off the gap between the sleeve 78 and the top of the can 74.

Figure 6:
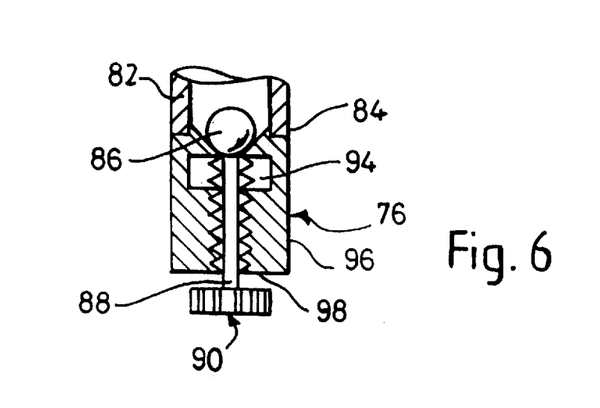

Detail of the valved closure member 76 is contained in FIG. 6. The lower end of the tube from which the reservoir is made is denoted by reference numeral 82 and this is sealed and secured to the upper end of the cylindrical closure member 76. The latter includes a concave depression 84 which forms a valve seat for a closure member which as shown comprises a spherical ball 86.

A central bore formed with a screw thread extends up through the centre of the closure member and a threaded pin 88 is threadedly engaged in the screw threaded bore and is rotatable by means of a driving member 90 at its lower end. Typically this comprises a cylindrical head, the external cylindrical surface of which is grooved to form splines or a non-circular section head which includes at least one flat surface therearound to provide a driving fit with a complementary shaped aperture in a driving member.

The head 90 is received in an appropriately shaped aperture in a central hub 92 of the rotatable base 72. Rotation of the base relative to the rest of the assembly will therefore cause rotation of the head 90 and pin 88 which by virtue of its screw threaded engagement will either rise up or move down relative to the closure device 76.

Upward movement of the pin 88 will lift the ball 86 off the seat 84 thereby allowing the pressure above the ball to be relieved and refrigerant in fluid form to pass between the ball 86 and the seat 84 to enter a cylindrical cavity 94.

This cavity is formed by constructing the closure device 76 from a cylindrical outer sleeve 96 and an inner core or plug 98 which may itself be threadedly engaged in the sleeve 96 or simply secured therein by means of an adhesive. By making the axial length of the plug 98 less than the axial extent of the cavity below the valve seat 84, an annular space forming the cavity 94 will be left when the plug 98 is flush with the lower end of the outer sleeve 96.

Figure 8:
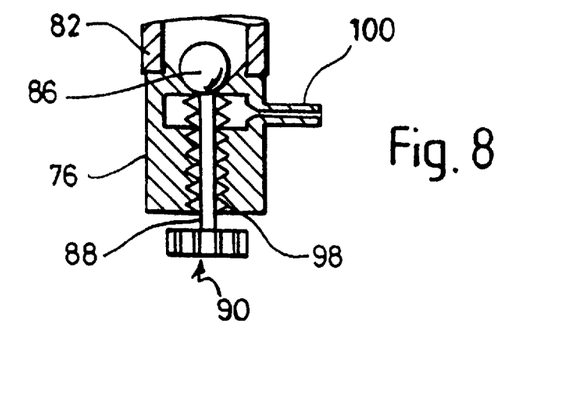

FIG. 8 shows an alternative and more preferred arrangement for releasing the fluid from the cavity 94. To this end an outlet pipe 100 communicates with the cavity so that it is not necessary for the fluid to escape between the thread of the pin 88 and the threaded profile in the plug 98.

Figure 7:
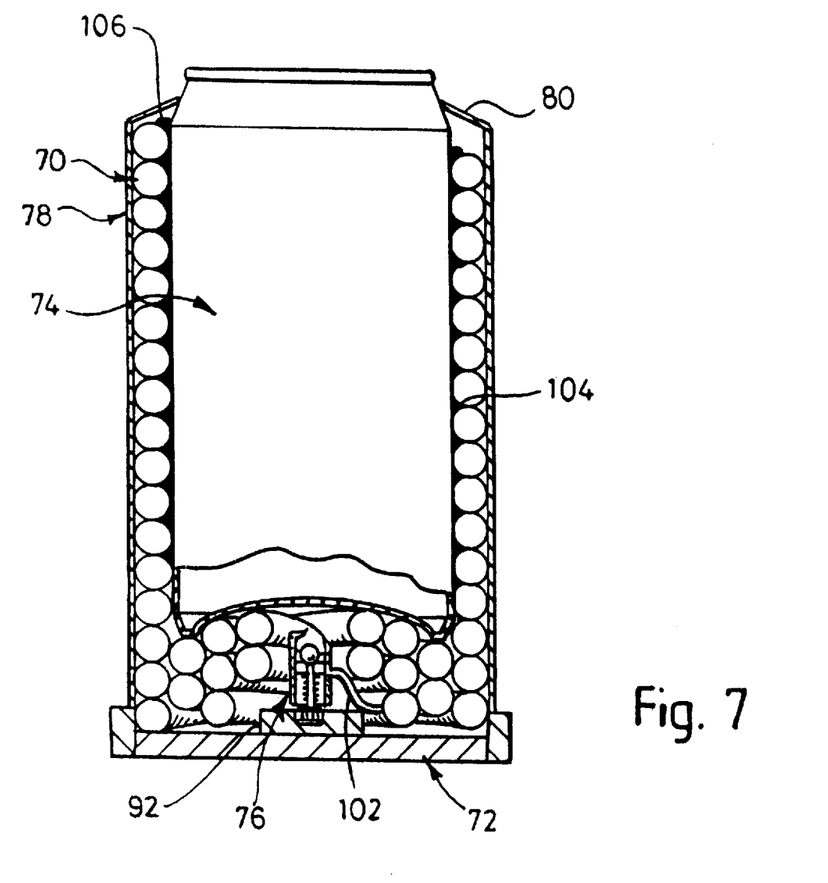

FIG. 7 shows a further modification which is available where a side exit tube such as 100 is provided. In FIG. 7, a further tube of much smaller diameter than the tube forming the reservoir 70, is fitted to the tube 100 and extends in between the bunched windings of the tube 70 until it reaches the cylindrical region of the reservoir where it is wound in the form of a second start thread between the coils of the reservoir tube 70 and the wall of the can 74. This tube is denoted by reference numeral 102 where it extends downwardly from where it is Joined to the pipe 100 and is further identified by reference numeral 104 which indicates one of the turns of the tube 102 around the can between adjacent turns of the coiled tube 70.

The upper remote end 106 of the tube 102 is open to atmosphere so that refrigerant released by the opening of the valve closure 86 will permeate through the tube 102 and be released at the upper opening 106.

By making the tube 102 from a material which has good thermal conductivity, it will be seen that the cold refrigerant material will be in intimate contact with the wall of the can over the majority of the length of the can wall until it evacuates to atmosphere through the opening 106.

Reverting to FIG. 5, a similar effect can be obtained in the arrangement shown in FIG. 5 if a good seal is provided between the rotatable base 72 and the outer sleeve 78 so that escaping fluid (typically gas) cannot escape at the lower end of the package and is forced to find its way up around the windings of the tubular reservoir 70 to escape through a small opening (or a number of small openings) such as 108.

The cooling effect of the rising refrigerant can of course be improved by forcing it to Dermeate up around the space between the windings and the surface of the can as opposed to the space between the windings and the outer sleeve 78. To this end this space is conveniently filled by a suitable filler such as glue or paste and one such filled region is denoted by reference 110. Both FIGS. 5 and 7 show the can cut-away in the lower region to reveal the concave domed base of the can and show how the coiled tube is bundled around so as to protrude into and form the domed protrusion for engaging the domed underside of the can.

Again in both FIGS. 5 and 7, the surrounding coiled tube is also shown in cross-section so as to reveal the detail of the lower end of the tube where it is secured to the closure device 76 which would otherwise be hidden.

We claim:

1. A device for chilling the contents of a beverage container comprising a shell, the interior of which is adapted to accommodate the container whose contents are to be chilled, and the wall of which constitutes an annular reservoir for liquified refrigerant gas under pressure, which surrounds the container, and means which is openable to permit the liquified refrigerant to escape from the reservoir and create a cooling effect on the wall of the container consequent on the change of phase from liquid to gas and expansion of the gas, so as to chill the container and the contents thereof, wherein an outer surface of the shell is formed with a heat insulating layer or sleeve so that the cooling effect is preferentially directed towards the interior of the shell and towards any container and its contents located therein, and wherein, at one end of the coil, windings of ever decreasing radii in at least one layer, form a closed end to the coil, which will normally engage the underside of a beverage container when the latter is fitted therein.

2. A device as claimed in claim 1, wherein the reservoir comprises a coiled tube filled with the liquified refrigerant gas.

3. A device as claimed in claim 2, further comprising means for fracturing, or forming, or exposing at least one hole in the tube wall to form an exit orifice through which the refrigerant can issue, when cooling is required.

4. A device as claimed in claim 2 wherein there is more than one layer of turns making up the coil, forming the cylindrical section of the shell.

5. A device as claimed in claim 2, wherein fracture of the tube wall to obtain cooling is effected by breaking open a weakened wall region of the tube.

6. A device as claimed in claim 5, wherein the weakened wall region of the tube is located so that escaping refrigerant is drawn from both the upper and lower reaches of the coil.

7. A device as claimed in claim 5, wherein at least one restrictor is provided in the tube on either side of the fracturable region thereof, to restrict the outflow of refrigerant.

8. A device as claimed in claim 1, wherein the discharge of the refrigerant from the pressurised reservoir is activated and controlled by a valve means.

9. A device as claimed in claim 1, which includes a second tube wound in between the turns of the first tube in contact with the container which communicates with a compartment at the base of the assembly and into which the refrigerant passes on venting the first tube, and a vent to atmosphere at the upper end of the assembly, so that the released refrigerant is forced to pass through the said second tube before venting to atmosphere, to further improve beat extraction from the container.

10. A device as claimed in claim 1, wherein a ring of material closes the gap between the external packaging sleeve and the wall of the can at the upper end of the coil.

11. A device as claimed in claim 1, wherein at least the tube in contact with the container is formed with a face around part of its circumference providing a greater surface area for contacting the external surface of the container.

12. A device for chilling the contents of a beverage container comprising a shell, the interior of which is adapted to accommodate the container whose contents are to be chilled, and the wall of which constitutes an annular reservoir for liquified refrigerant gas under pressure, which surrounds the container, means which is openable to permit the liquified refrigerant to escape from the reservoir and create a cooling effect on the wall of the container consequent on the change of phase from liquid to gas and expansion of the gas, so as to chill the container and the contents thereof, and a member at the base of the device, which is rotatable relative to the shell to effect venting of the reservoir and release of the refrigerant.

13. A device as claimed in claim 12, wherein the rotatable member forms a base on which the assembly can stand.

14. A device as claimed in claim 12, wherein rotation of the rotatable member effects the fracture of the pipe from which the coil is formed.

15. A device as claimed in claim 9, wherein a rotatable base member is provided and rotation thereof serves to rotate and elevate a valve activator, to open a valve and permit refrigerant to escape.

16. A method of forming a shell for receiving a beverage container, comprising the steps of filling a length of tube with a liquified refrigerant gas, sealing the tube, winding the tube around a mandrel to form a cylindrical sleeve, whose internal diameter will accommodate as a close fit the beverage container, and fitting an external packaging sleeve around the coiled tube, and wherein the winding of the coil is continued below the underside of the container in a layer in which the turns are of successively decreasing radius, so as to close off the lower end of the coil and provide a platform for the underside at the container to rest on.

17. A method as claimed in claim 16, comprising the further step of fitting to the tube a means for venting the refrigerant to atmosphere, when it is required to cool a container.

18. The method of claim 16, wherein the coil is wound as a multiple layer helix.

19. The method of claim 1, wherein the final end of the tube is formed into a non-circular cross-section for engaging in a similarly shaped non-circular aperture in a member which is rotatable relative to the coil, thereby to twist the end of the tube relative to the remainder thereof and thereby break the tube where it protrudes from the windings.

20. The method of claim 19, wherein the tube is formed with a restricted internal cross-section above the weakened region.

21. The method of claim 20, wherein the restricted internal cross-section is obtained by fixing into the tube a restrictor having only a tiny orifice for the refrigerant to pass through, so that when the tube is broken, the refrigerant can only escape through the tiny orifice in the restrictor in a controlled manner.

22. The method as claimed in claim 16, wherein the refrigerant is selected from the group consisting of a liquified CFC gas, a liquified HCFC gas, a liquified HFC gas; liquified Isobutane; liquified Carbon Dioxide; a mixture of liquified Carbon Dioxide and either Isobutane or a CFC, HCFC, or HFC gas; and a liquified refrigerant known as 22, or 134A or KLE461 or MP39.

* * * * *